(12) United States Patent
Lienhart et al.

(10) Patent No.: US 7,024,575 B2
(45) Date of Patent: Apr. 4, 2006

(54) APPARATUS AND METHOD FOR TIME SYNCHRONIZATION OF A PLURALITY OF MULTIMEDIA STREAMS

(75) Inventors: Rainer W. Lienhart, Santa Clara, CA (US); Igor V. Kozintsev, San Jose, CA (US); Minerva M. Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 10/294,271

(22) Filed: Nov. 14, 2002

(65) Prior Publication Data

US 2004/0098633 A1 May 20, 2004

(51) Int. Cl.
*H04N 5/93* (2006.01)
*G06F 15/00* (2006.01)

(52) U.S. Cl. .................. 713/400; 370/469; 386/61; 386/12; 640/825.2; 348/500; 715/500.1

(58) Field of Classification Search ............... None
See application file for complete search history.

(56) References Cited

U.S. PATENT DOCUMENTS

| | | | |
|---|---|---|---|
| 5,623,483 A * | 4/1997 | Agrawal et al. | 370/253 |
| 6,188,703 B1 * | 2/2001 | Dobson et al. | 370/537 |
| 6,359,985 B1 * | 3/2002 | Koch et al. | 380/54 |
| 6,381,402 B1 * | 4/2002 | Sugita et al. | 386/94 |
| 6,912,000 B1 * | 6/2005 | Shigeta | 348/222.1 |

* cited by examiner

*Primary Examiner*—Lynne H. Browne
*Assistant Examiner*—Anand B. Patel
(74) *Attorney, Agent, or Firm*—Blakely, Sokoloff, Taylor & Zafman LLP

(57) ABSTRACT

An apparatus and method for time synchronization of a plurality of multimedia streams are described. In one embodiment, the method includes the concurrent capture of multimedia data via a plurality of multimedia platforms. During the concurrent capture of the multimedia data, each of the multimedia platforms receives a synchronization signal from a synchronization generation unit. In response, each platform processes a received synchronization signal to generate a common reference clock signal among each of the platforms. Once the common clock signal is generated, each of the platforms synchronizes captured multimedia data to form multimedia stream data according to the common reference clock signal. As such, the plurality of multimedia platforms are able to perform collaborative signal processing tasks of multimedia streams, including, for example, array signal processing algorithms.

43 Claims, 12 Drawing Sheets

APPARATUS AND METHOD FOR TIME SYNCHRONIZATION OF A PLURALITY OF MULTIMEDIA STREAMS

FIELD OF THE INVENTION

One or more embodiments of the invention relate generally to the field of distributed multimedia platform synchronization. More particularly, one or more of the embodiments of the invention relates to a method and apparatus for time synchronization of a plurality of multimedia streams.

BACKGROUND OF THE INVENTION

Distributed computer environments attempt to harness the power of several computers in order to perform desired processing tasks. Oftentimes, this usage model enables several computers to collaboratively perform computationally intensive tasks within substantially reduced amounts of time. Generally, the divide and conquer approach provided by parallel computing enables utilization of available personal computers, rather than purchasing of a high performance, server-based computer system for performing the computationally intensive tasks.

Until recently, the only collaborative usage model for multiple personal computers (PCs) was based on distributing purely computational tasks. As such, distributed computing has generally not been applied to synchronized capture and/or processing of signals, especially audio/video signals (and data streams). In general, signal processing of audio and video signals (multimedia data) is very sensitive to time jitters, delays and drifts. As a result, signal processing for such multimedia data requires precise synchronization for high quality input/output processing, as well as robustness and reliability issues.

Unfortunately, precise capture and synchronization of inputs is not guaranteed on current platforms. As a result, new usage paradigms for PCs, personal digital assistants (PDAs), Tablets and the like, as devices for collaborative signal processing of multimedia signals are generally not available. For example, signal processing on a common PC platform can lead to several problems when several I/O devices are used to capture audio and visual information utilizing, for example, video cameras and microphones.

As such, various problems arise due to the fact that different I/O devices will be triggered by separate oscillations. Unfortunately, the separate oscillations cause resulting audio samples and video frames to be unaligned along an absolute timeline, thereby inducing some relative offsets. Moreover, due to differences in oscillator frequencies, audio and visual data will drift away across multiple channels and streams over time. Likewise, multimedia signal processing within multiple PC platforms can lead to several problems.

Within multiple PC platforms, audio and visual I/O devices will not be synchronized in time scale, which will cause data samples to drift and/or be shifted relative to each other. The extent of the shift, jitter and/or drift on the existing platforms depends on hardware and software parameters and can be very significant, sometimes causing total degradation of the process signals from the non-synchronized input streams. Such drifts, delays and/or jitters can cause significant performance degradation for, for instance, array signal processing algorithms.

For example, in an acoustic beam former with 10 centimeter (cm) spacing between microphones, an error of only 0.01 percent in time can cause error of 20 degrees in the beam direction. Due to this fact, current implementations of audio array process algorithms rely on dedicated circuitry for the synchronization between multiple I/O channels. Unfortunately, implementing such an approach with existing PC platforms would require a major overhaul of the current hardware utilized by the PC platforms. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
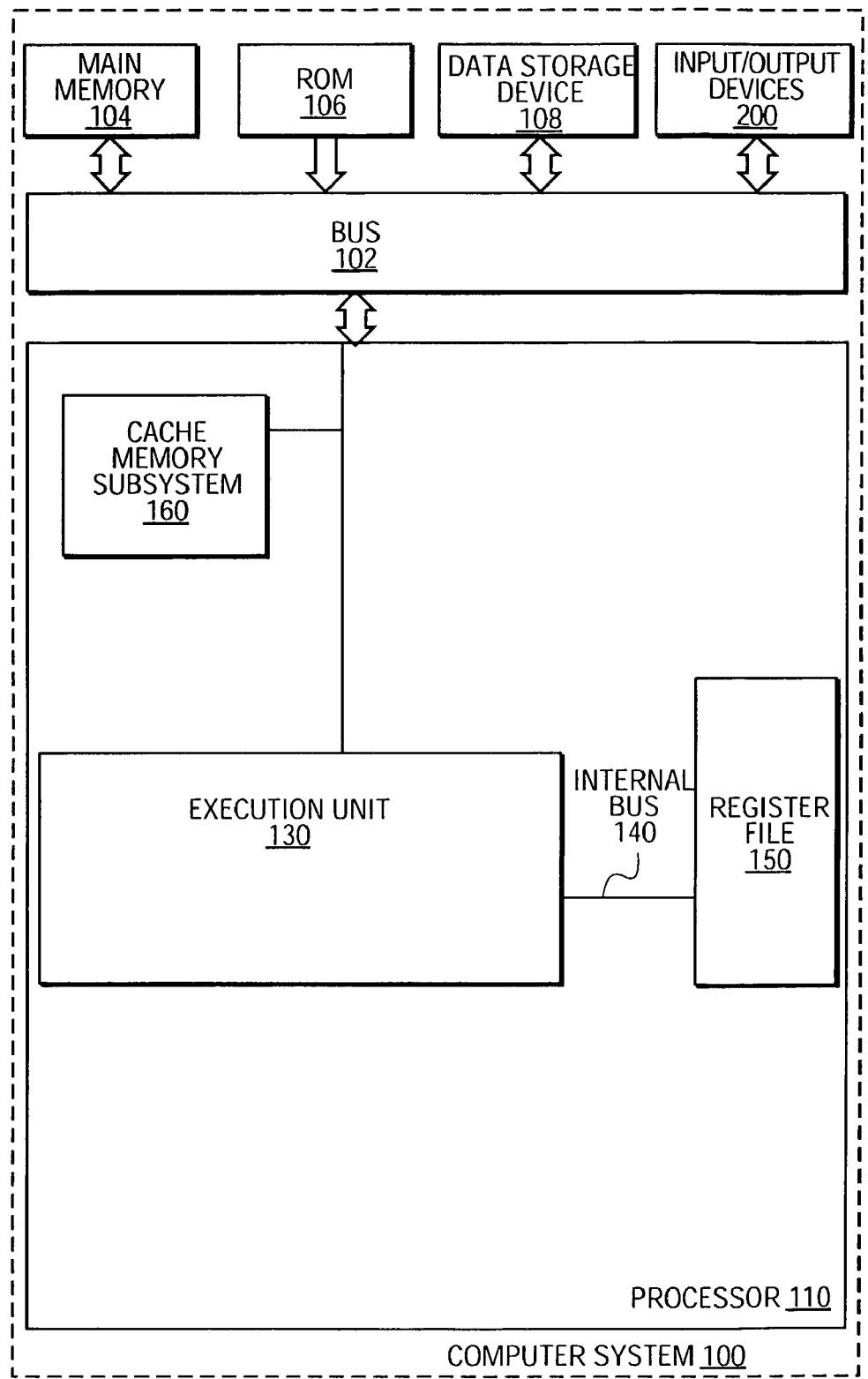
FIG. 1 depicts a block diagram illustrating a computer system as known in the art in which one embodiment of the present invention may be implemented.

A method and apparatus for time synchronization of a plurality of multimedia streams are described. In one embodiment, the method includes the concurrent capture of multimedia data via a plurality of multimedia platforms. During the concurrent capture of the multimedia data, each of the multimedia platforms receives a synchronization signal from a synchronization generator and distributes it to one or more media capture cards. In response, each platform processes one or more received synchronization signals to generate a common reference clock signal among each of the platforms and their capture devices. Once the common clock signal is generated, each of the platforms processes the captured multimedia data to form multimedia data streams according to the common reference clock signal. As such, the plurality of multimedia platforms are able to perform collaborative signal processing of multimedia streams, including, for example, array signal processing algorithms.

In the following description, for the purposes of explanation, numerous specific details are set forth in order to provide a thorough understanding of the embodiments of the present invention. It will be apparent, however, to one skilled in the art that the various embodiments of the present invention may be practiced without some of these specific details. In addition, the following description provides examples, and the accompanying drawings show various examples for the purposes of illustration. However, these examples should not be construed in a limiting sense as they are merely intended to provide examples of the embodiments of the present invention rather than to provide an exhaustive list of all possible implementations of the embodiments of the present invention. In other instances, well-known structures and devices are shown in block diagram form in order to avoid obscuring the details of the various embodiments of the present invention.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

In an embodiment, the methods of the various embodiments of the present invention are embodied in machine-executable instructions. The instructions can be used to cause a general-purpose or special-purpose processor that is programmed with the instructions to perform the methods of the embodiments of the present invention. Alternatively, the methods of the embodiments of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Discs (CD/DVD-ROMs/RWs/Rs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

System Architecture

FIG. 1 shows a computer system 100 upon which one embodiment of the present invention can be implemented. Computer system 100 comprises a bus 102 for communicating information, and processor 110 coupled to bus 102 for processing information. The computer system 100 also includes a system memory subsystem, including main memory 104, read only memory (ROM 106) and data storage device 108, coupled to bus 102 for storing information and instructions for processor 110. Processor 110 includes an execution unit 130 coupled to a register file 150 via internal bus 140 and a cache memory subsystem 160.

The cache subsystem may include high speed, temporary memory buffers (cache) that are coupled to execution unit 130 and store frequently and/or recently used information for processor 110. As described herein, memory buffers, include but are not limited to cache memories, solid state memories, RAM, synchronous RAM (SRAM), synchronous data RAM (SDRAM) or any device capable of supporting high speed buffering of data. Accordingly, high speed, temporary memory buffers are referred to interchangeably as cache memories or one or more memory buffers.

Figure 2:
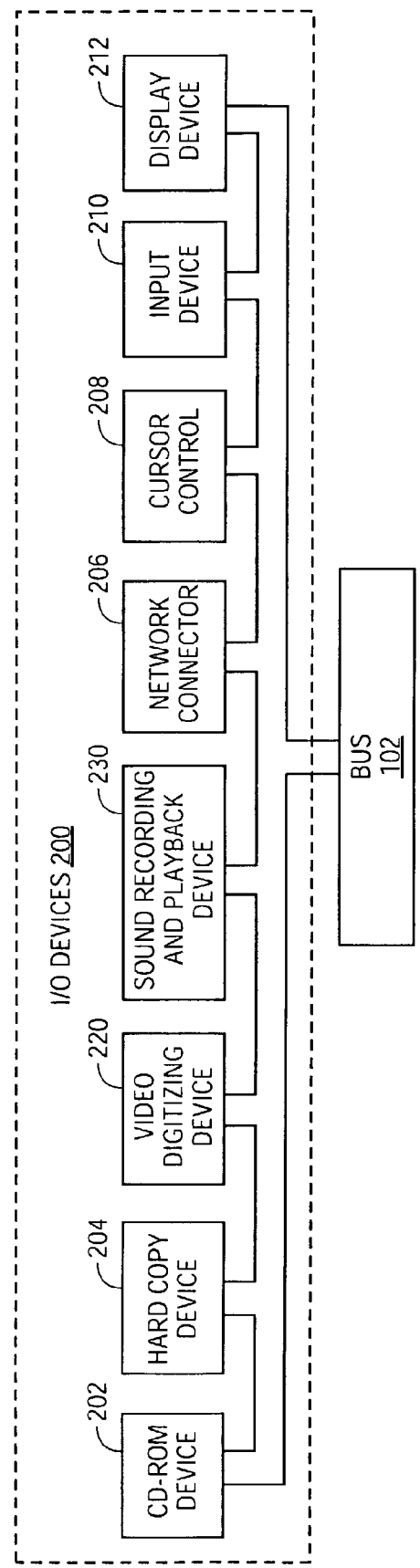
FIG. 2 depicts a block diagram further illustrating input/output devices of computer system, as depicted in FIG. 1.

FIG. 2 further illustrates input/output (I/O) devices 200 of computer system 100 as depicted in FIG. 1. As illustrated, the computer system 100 may include a display device 212 such as a monitor. The display device 212 may include an intermediate device such as a frame buffer. Computer system 100 also includes an input device 210 such as a keyboard and a cursor control 208 such as a mouse, or trackball, or track pad. The display device 212, the input device 210, and the cursor control 208 are coupled to bus 102. Computer system 100 may include a network connector 206 so that computer system 100 may be connected as part as a local area network (LAN) or a wide area network (WAN) such as, for example, the Internet.

Additionally, computer system 100 can also be coupled to a device for sound recording and playback 230 such as an audio digitization device coupled to a microphone for recording voice input for speech recognition or for recording sound in general. Input/output devices 200 of computer system 100 may also include a video digitizing device 220 that can be used to capture video images in conjunction with sound recording device 230 to capture audio information associated with the video images. Finally, the input devices 200 may also include a hard copy device 204 such as a printer and a CD-ROM device 202. The input devices 200 (202, 204, 206, 208, 210, 212, 220 and 230) are also coupled to bus 102.

As such, computer system 100 as depicted in FIG. 1 may be utilized to capture multimedia data including, for example, audio and video data from a selected scene, environment, or the like. Currently, many individuals utilize personal computers (PCs) such as depicted in FIG. 1 in order to capture live audio/video data (multimedia scene data) through, for example, a camera coupled to a port of computer system 100 (not shown) such as, for example, a universal serial bus (USB) port. This data is then generated into a streaming media format (Multimedia Stream Data) including, but not limited to, Microsoft® advanced steaming format (ASF) files, motion picture experts group (MPEG) standards such as MPEG-1/2/4, and audio layer-3 (MP3) files, Real Audio G2 files, QDesign2 files, or the like.

Likewise, an audio capture device such as, for example, a microphone may be utilized by computer system 100 to capture audio information associated with the captured multimedia scene data. Accordingly, as individuals attempt to utilize their personal computers in order to capture, for example, live audio/video data, it is generally recognized that audio/video data is most effectively captured utilizing one or more data capture devices. Moreover, a current emphasis in current design technology is parallel computing.

Parallel computing espouses the use of distributed computer environments which attempt to harness the power of several computers in order to perform desired processing tasks. In other words, various individuals have recognized that the processing power available from a multitude of computers owned by businesses and corporations, or the like, may possibly be put to use in order to provide some benefit to companies, individuals, or the like. As such, these usage models enable several computers to collaboratively perform computationally intensive tasks within substantially reduced amounts of time.

Figure 3:
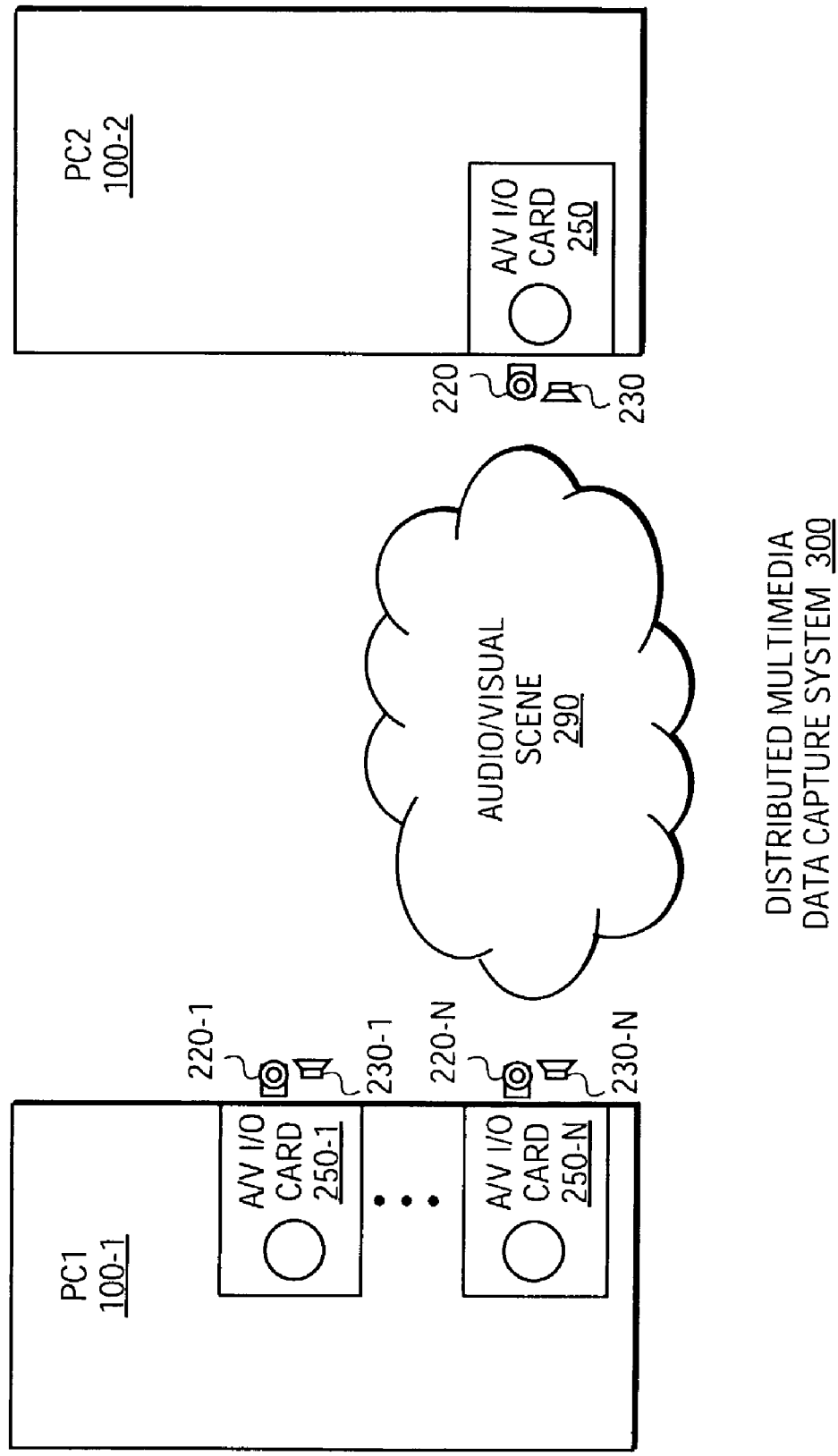
FIG. 3 depicts a block diagram illustrating a distributed multimedia data capture system, in accordance with one embodiment of the present invention.

Generally the divide and conquer approach provided by parallel computing enables utilization of available personal computers rather than purchasing of a high performance, server based system for performing computationally intensive tasks. Until recently, the only collaborative usage model for personal computers was based on distributing computing for purely computational tasks. As such, distributed computing has generally not been applied to distributed signal capturing and processing, and especially not to distributed capturing and processing of live audio/video signals (multimedia scene data). However, one embodiment of the present invention is directed toward a distributed multimedia data capture system, for example, data capturing system 300 as depicted in FIG. 3.

Unfortunately, signal processing of audio and video signals (multimedia scene data) is very sensitive to time jitters, delays and drifts. For example, given N audio sequences $A_i(t), \ldots, A_j(t), \ldots, A_N(t)$ relative delay, jitter and drift are defined as follows:

The relative delay between two audio sequences $A_i$ and $A_j$ is the time offset (e.g., in milliseconds) between two samples $a^i_t = A_i(t)$ and $a^j_{t+offset} = A_j(t+\text{offset})$ recorded at the same (absolute) time. We write $a^i_t \cong a^j_{t+offset}$. (Equation 1)

Offset can be positive or negative.

Jitter is a measure of stability of a given audio sequence $A_i(t)$. It measures the variance (e.g., in milliseconds) between two contiguous sync signals with in an audios sequence.

The drift between two audio sequences $A_i(t)$ and $A_j(t)$ results from small differences in their respective sampling frequencies. It is, for instance, expressed in time (e.g., seconds) needed to cause a shift by one sample, at a given sampling frequency, i.e., given $a^i_t \cong a^j_t$ the drift is defined as $a^i_{t+drift-1} \cong a^j_{t+drift}$ or $a^i_{t+drift} \cong a^j_{t+drift-1}$, (Equation 2) respectively.

Referring again to data capture system 300, as depicted in FIG. 3, the multimedia platform 100 includes a plurality of audio and/or audio/video (A/V) I/O (capture) cards 250 (250-1, ..., 250-N) as illustrated, each I/O card 250 includes a video capture device 220 and/or an audio capture device 230. However, if a first PC (PC1) 100-1 is used to capture audio/visual scene 290 several problems may arise between the multimedia data streams generated by the various I/O cards 250 of PC1 100-1. The problems arise due to the fact that different I/O devices are triggered by separate oscillators (which causes drifts), start to capture at different time instances (which causes relative delays), and exhibit jitter in their oscillators. Consequently, resulting audio samples as well as video frames will not be aligned on an absolute timeline thus inducing some relative offsets, jitters, and drifts.

Likewise, a second PC (PC2) 100-2 can be utilized in conjunction with PC1 100-1 in order to also capture the audio/visual scene data 290 as part of the distributed multimedia data capture system 300. Unfortunately, the I/O cards used to capture the audio/visual scene 290 will generate multimedia data streams that are not synchronized within a common time scale. As a result, data samples between the generated multimedia stream data will be shifted and tend to drift relative toward one another.

The extent of drift experienced by existing platforms depends on many hardware and software parameters and can be very significant, sometimes causing total degradation of the processed signals captured by the non-synchronized stream inputs. Such drifts, delays, and/or jitters can cause significant performance degradation for instance, within, array signal processing algorithms including, but not limited to, acoustic beam formers, blind signal separation (BSS), and the like. For example, within an acoustic beam former with ten centimeter spacing between microphones an error of only 0.01% in time can cause an error of 20 degrees in the beam direction.

Consequently, current implementations of audio array processing algorithms rely on dedicated circuitry for tight synchronization (sync) between multiple I/O channels. However, for existing PC platforms, for example, distributed data capture system 300, as depicted in FIG. 3, the implementation of a distributed data capture system performing, for example, array signal processing requires a major overhaul of system hardware. For existing PC platforms, drift between multimedia data streams generated by, for example, distributed data capture system 300, as depicted in FIG. 3, can be quite significant.

TABLE 1

NON-SYNCHRONIZED MULTIMEDIA STREAM DATA

|  | Avg. number of samples between two sync signals | Variance (in samples) | Duration (in sec) | Drift |
|---|---|---|---|---|
| Channel 1 L | 5114.761068 | 0.194284 | 639 | Ref |
| Channel 1 R | — | — | — |  |
| Channel 2 L | 5114.807861 | 0.166190 | 639 | ~1 sample per 2.5 sec. |
| Channel 2 R | 5114.808367 | 0.165871 | 639 | ~1 sample per 2.5 sec. |
| Channel 3 L | 5114.790936 | 0.174859 | 638 | ~1 sample per 3.9 sec. |
| Channel 3 R | 5114.791225 | 0.174694 | 638 | ~1 sample per 3.9 sec. |

For example, Table 1 illustrates the drift that may be caused utilizing a data capture system using three identical peripheral component interconnect (PCI)-based audio capture cards with stereo input. As illustrated, a first channel at a left input (1L) includes an average number of samples between two sync signals at an amount of 5114.761068. The variance in samples of this reference signal is 0.194284 with a duration of 639 seconds. However, a second channel used to capture audio/video scene data with the second audio capture card will have a drift of one sample every 2.5 seconds. Likewise, audio/video image data captured via a third channel (i.e., third capture card) may have a drift of one sample every 3.9 seconds.

Figure 4:
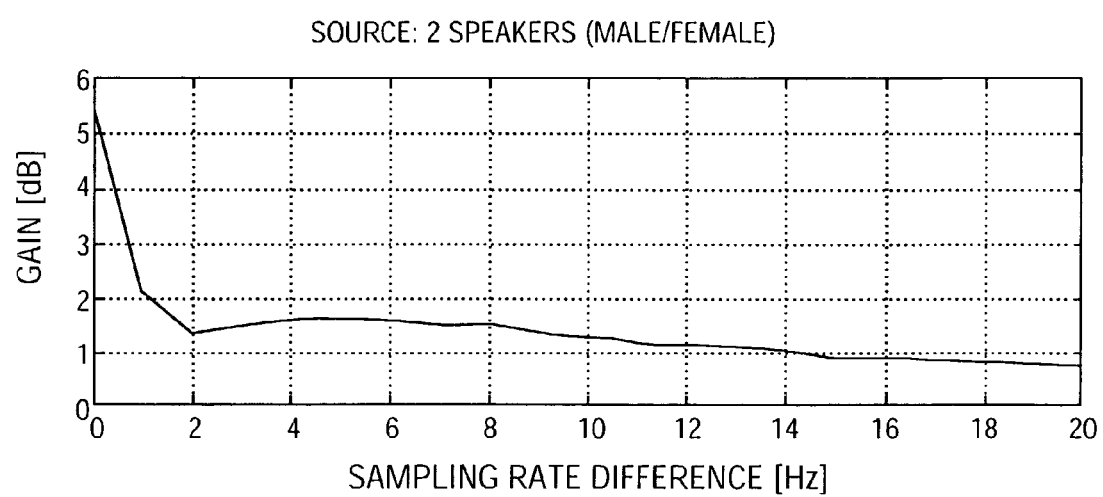
FIG. 4 depicts a graph illustrating the gain/loss in signal quality by applying BSS (Blind Source Separation) with respect to sampling rate differences between multimedia stream data captured by the multimedia capture system as depicted in FIG. 3.

FIG. 4 illustrates a graph depicting the impact of sampling rate differences such as, for example, illustrated in Table 1 on the gain in signal quality with BSS. For example, in a multi-speaker environment it is desirable to separate the audio signals that belong to different sources. An advanced array signal processing algorithm such as blind source separation (BSS) may be applied to perform joint processing of multiple captured audio signals to extract multiple speakers. In one embodiment, BSS was performed on an audio mix of two speakers using two microphones connected to two different PCs such as, for example, distributed data capture system 300, as depicted in FIG. 3.

As illustrated in FIG. 4, the quality of speaker separation (higher gain corresponds to better quality) decreases as a function of increased sampling frequency differences between audio sources. As illustrated even a 2–5 Hz sampling frequency drift (from 16000 Hz nominal frequency) causes significant degradation of the BSS performance (both in terms of dBs and the perceptually assessed quality). In other words, the smaller the sampling rate difference or drift, for example, as illustrated in Table 1, the higher the gain produced. Likewise as the sampling difference is increased, the gain dramatically drops below accepted levels.

Figure 5:
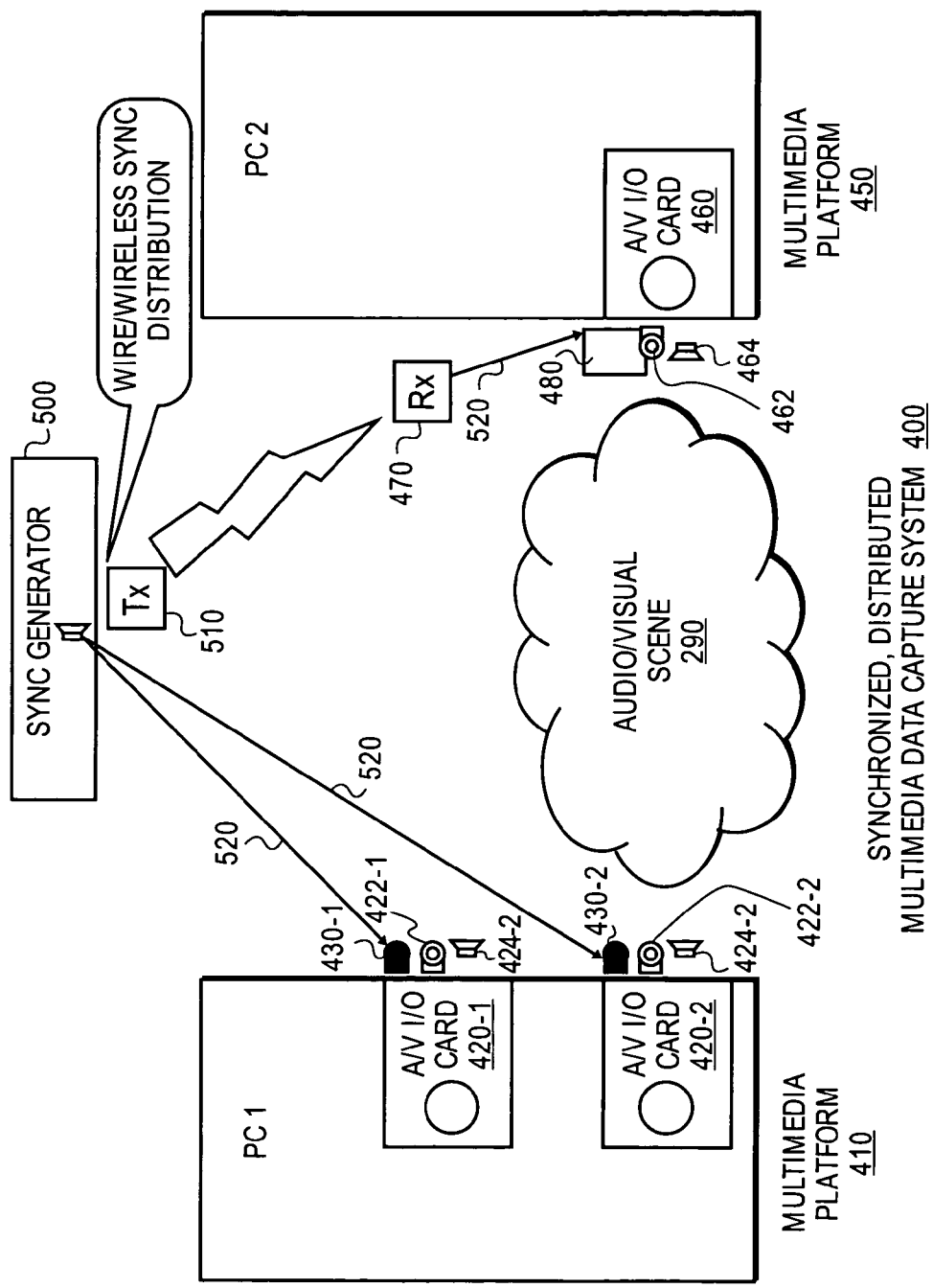
FIG. 5 depicts a synchronized distributed multimedia data capture system, in accordance with one embodiment of the present invention.

Accordingly, one embodiment of the present invention provides a synchronized, distributed multimedia data capture system 400, for example, as depicted with reference to FIG. 5. As illustrated in FIG. 5, the data capture system 400 may include a plurality of multimedia platforms. In the embodiment illustrated, multimedia platform 410, as well as multimedia platform 450 are provided. However, FIG. 5 should not be construed in a limiting sense and is provided to illustrate one embodiment of the present invention.

In the embodiment depicted, multimedia platform 410, as well as multimedia platform 450 may be provided utilizing computer system 100, as depicted in FIG. 1. As illustrated, multimedia platform 410 includes a plurality of I/O cards 420, for example, as illustrated with reference to FIG. 3. However, in addition to having a microphone 424, as well as a video capture device 422, each audio/video card includes a wired link input 430 which is used to receive a multimedia synchronization signal 520, which is generated by sync generator 500.

In one embodiment, sync generator 500 is configured utilizing a computer system, such as computer system 100, as depicted in FIG. 1. In the embodiment illustrated sync generator 500 generates synchronization signal 520. In one embodiment, the synchronization signal is selected as a maximum length sequences (MLS) signal, which is generally comprised of white noise, to form an audio sync signal. However, in alternate embodiments, a multimedia synchronization signal may be selected if desired based on the specific implementation.

In the embodiment illustrated, synchronization signal 520 may be provided via a wired link, for example, to multimedia platform 410 and/or may be transmitted wireless via transmitter 510 and receiver 470 to multimedia platform 450. An example of a wireless transmitter 510 and receiver 470 is an RF-based transmitter and receiver. In one embodiment, a single multimedia synchronization signal is generated which is transmitted to each of the multimedia platforms via either a wired link or a wireless link. As such, multimedia platform 450 includes I/O card 460 with a video capture device 462, as well as an audio capture device 464.

However, in contrast to multimedia platform 410, multimedia platform 450 includes a wireless receiver (Rx) 470 which is used to capture the received multimedia synchronization signal. In one embodiment, the transmitter modulates the synchronization signal onto a multimedia signal, (e.g., audio signal), which in turn is modulated onto some wireless carrier signal and the receiver demodulates the received signal in order to generate the multimedia modulated synchronization signal 520 that is received by wired link input 480. The multimedia modulated synchronization signal (i.e., the synchronization signal modulated onto a multimedia signal) is then provided to the video capture device(s) and/or audio capture device(s) in order enable synchronization of captured audio/visual scene data 290. In one embodiment, the wireless transmission of the synchronization signal may be provided using, for example, wireless audio transmission via a U.S. Robotics Sound Link Solution.

In accordance with one embodiment, an audio synchronization signal is generated as the multimedia synchronization signal. As such, the audio synchronization signal may be analyzed to determine a target sampling frequency and target start time. Based on the target start time, errors may be detected between captured audio stream data as compared to the received audio synchronization signal. For example, a relative delay may be calculated in accordance with Equation (1) to provide a positive or negative offset between captured audio stream data, as compared to the received audio synchronization signal.

Likewise, jitter may be calculated as a variance in audio samples between the audio synchronization signal and generated audio stream data. Finally, drift may be calculated in accordance with Equation 2 to provide a frequency offset between the audio synchronization signal and captured audio stream data. In an alternate embodiment, the synchronization signal could be provided utilizing 802.11a and 802.11b wireless standards to provide a target sampling rate signal. As such, the distributed data capture system 400 will determined a target sampling frequency, as well as errors between the received synchronization signal and the captured multimedia stream data.

Once errors are determined within generated multimedia stream data, each multimedia platform 410 is responsible, for example, for resampling of generated multimedia stream data to synchronize the multimedia stream data generated by each I/O card of each multimedia platform. Consequently, once all generated multimedia stream data is synchronized, the captured stream data may be provided to an array signal processing computer (not illustrated). The array signal processing computer may then perform, for example, beamforming, blind signal separation (BSS), multi-modal recognition, or the like, utilizing the synchronized multimedia stream data. Likewise, embodiments of the present invention may be performed within multimedia data capture system 400 using, for example, camcorders, video capture devices, or the like, which include multiple input channels.

As such, a wireless audio transmission device can convert an RF synchronization signal into a standard synchronization signal. Once converted, the synchronization signal is embedded into the captured multimedia data. Consequently, the synchronization signal is available to the application layer as a separate audio track, which can then be processed in order to synchronize captured multimedia data utilizing, for example, resampling. Accordingly, synchronization signals are formed within sync generator 500 which utilizes its own clock to modulate a carrier wave signal. The carrier wave signal can be chosen from may possible types. However, in one embodiment, maximum length sequences (MLS) are utilized due to their excellent auto-correlation characteristics.

As illustrated, the synchronization signals are delivered to the various devices via one of a wired link and a wireless link. For wireless distribution, a simple frequency modulated (FM) radio transmitter and receiver may be used to modulate/demodulate the synchronized signals. However, in one embodiment, formation of a synchronized distributed multimedia data capture system 400, for example, as depicted in FIG. 5, may require the measure of absolute latencies of individual transmitters and receivers for calibration.

Accordingly, the distribution of audio synchronization over dedicated links, rather than through the air, avoids propagation delay and enables synchronization of the various generated multimedia stream data. Therefore, an embodiment of the present invention may be implemented within conventional data capture devices provided the data capture device includes an additional audio input channel that is dedicated for time synchronization purposes. In addition, since the sync signals are sent via electromagnetic waves, propagation time can be neglected in most distributed computing environments. In another embodiment of the present invention the synchronization signal may be added as a watermark to the Multimedia input (audio/video) before capturing, thus not even requiring any additional input channel. During subsequent processing, the watermark encoding of the synchronization information can be extracted.

In contrast, current solutions for synchronization of multiple multimedia streams typically rely on a dedicated wire link for distributing common clocks. The disadvantages of such an approach include the inability to handle situations where multimedia I/O hardware is physically located on separate platforms or in multiple environments (e.g., two audio capture devices located on different laptops or even within the same computing platform), but with no provision for common clock distribution (e.g., audio and video capture cards with no proprietary synchronization mechanism).

Accordingly, one embodiment of the present invention addresses both situations without requiring significant changes to hardware functionality. In one embodiment, a U.S. Robotics Audio Link Solution, or the like, provides wireless audio transmission. Furthermore, as illustrated by Table 2, utilizing a multimedia synchronization signal, captured multimedia stream data may be synchronized in order to drastically eliminate drift. Consequently, by minimizing the drift time, drift errors are drastically eliminated. For example, as illustrated by Table 1 the drift is drastically reduced to 0.061 seconds as compared to the 2.5 seconds and 3.9 seconds drift listed Table 1. Procedural methods for implementing embodiments of the present invention are now described.

Operation

Figure 6:
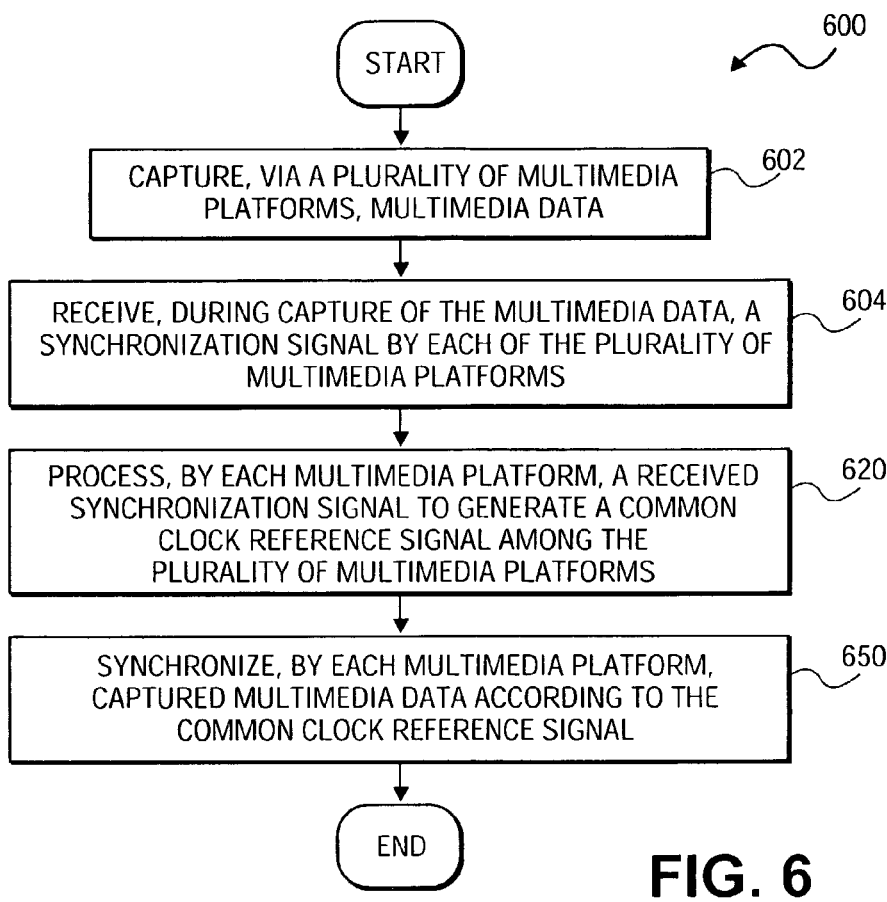
FIG. 6 depicts a flow chart illustrating a method for synchronization of a plurality of multimedia stream data, in accordance with one embodiment of the present invention.

FIG. 6 depicts a flow chart illustrating an embodiment of a method 600 for generating synchronized multimedia data streams within a plurality of platforms such as system 400, as depicted with reference to FIG. 5. At process block 602, multimedia data is captured via a variety of multimedia platforms. At process block 604 each multimedia platform receives a synchronization signal during capture of the multimedia data. Once the synchronization signal is received, at process block 620, each platform processes the receive synchronization signal to generate a common clock reference signal among the plurality of platforms.

Finally, at process block 650 each platform synchronizes captured multimedia data according to the common clock reference signal. In an alternative embodiment, all of the captured multimedia data may be synchronized within one or more multimedia platforms. In one embodiment, the synchronization signal is received by each platform via one of a wired link and a wireless radio frequency (RF) link. For example, as illustrated with reference to FIG. 5, media platform 410 receives the synchronization signal via wired link 430, whereas multimedia platform 450 receives the synchronization signal via receiver 470. However, regardless of the source of the synchronization signal, each multimedia platform is able to either directly process the synchronization signal or demodulate the synchronization signal to detect desired synchronization data.

Figure 7:
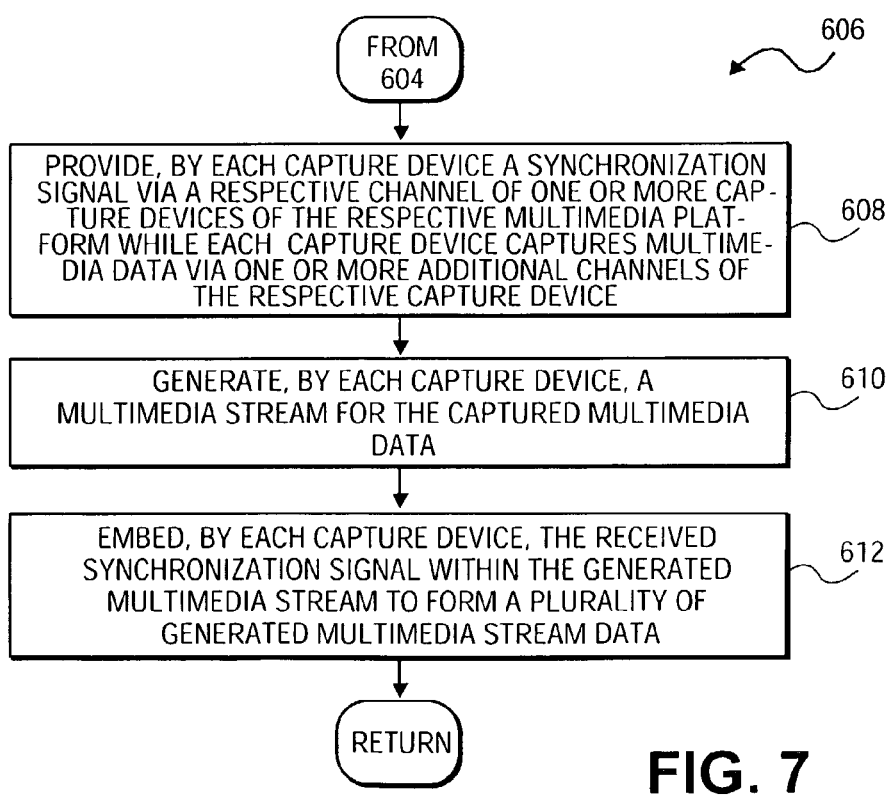
FIG. 7 depicts a flow chart illustrating an additional method for receiving a synchronization signal during capture of multimedia data, in accordance with a further embodiment of the present invention.

FIG. 7 depicts a flow chart illustrating an additional method 606 for receiving the synchronization signal process block 604, as depicted in FIG. 6, in accordance with the further embodiment of the present invention. At process block 608, each multimedia platform provides a synchronization signal to a respective channel of one or more capture devices of the respective multimedia platform while each capture device captures multimedia data via one or more additional channels. Capture devices may include, but are not limited to, video digitizing devices, sound recording and playback devices, microphones, video recording devices, or the like. Once received, at process block 610, each capture device of each multimedia platform generates a multimedia stream from the captured multimedia data.

Finally, at process block 612 each multimedia platform embeds the received synchronization signal within the gen-

TABLE 2

SYNCHRONIZED MULTIMEDIA STREAM DATA

| | Sync type | Avg. number of samples between two sync signals | Variance (in samples) | Duration (in sec) | Drift |
|---|---|---|---|---|---|
| T20 | wired | 5115.479576 | 0.262896 | 386 | Ref |
| T23 | wired | 5117.375490 | 0.274340 | 386 | ~1 sample per 0.061 sec. |
| T20 | wireless | 5115.277620 | 0.261723 | 650 | Ref |
| T23 | wireless | 5117.382857 | 0.284135 | 650 | ~1 sample per 0.061 sec. | erated multimedia stream such that the plurality of multimedia platforms collectively form a plurality of generated multimedia stream data. In one embodiment, embedding of the multimedia synchronization signal ensures that the synchronization signal is available to the application layer for stream synchronization processing. Likewise, captured video stream data is synchronized with the received synchronization signal using a dedicated synchronization audio channel such as provided by video recorders, camcorders, and the like.

Figure 8:
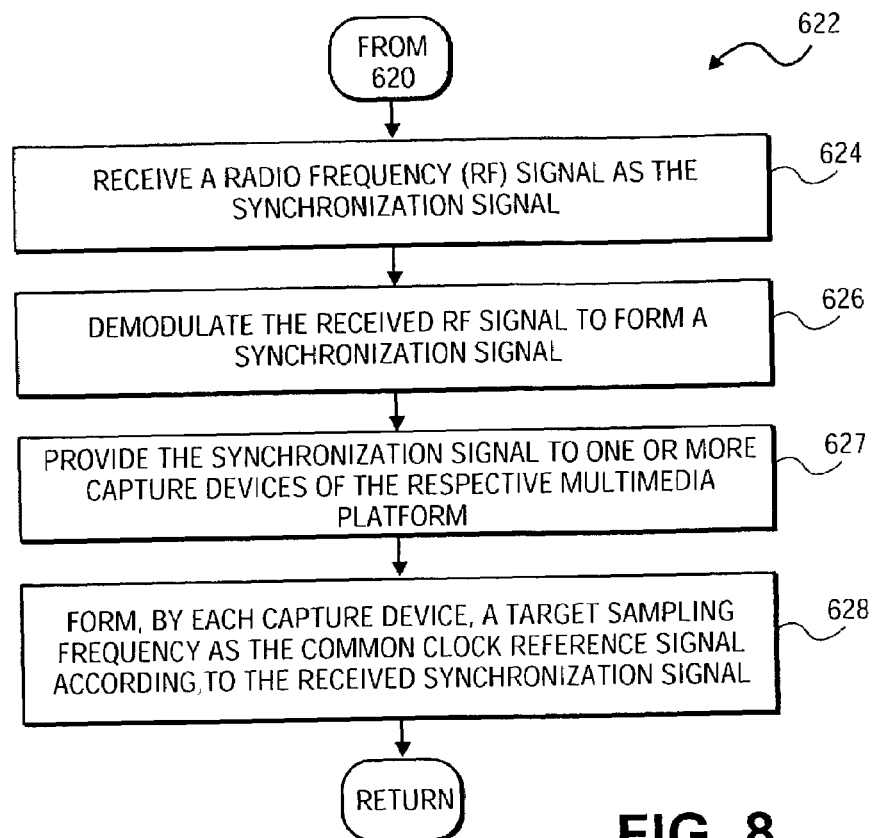
FIG. 8 depicts a flow chart illustrating an additional method for processing a receive synchronization signal in order to generate a common clock reference signal, in accordance with a further embodiment of the present invention.

FIG. 8 depicts a flow chart illustrating an additional method 622 for processing the received synchronization signal in accordance with the further embodiment of the present invention. At process block 624 a radio frequency (RF) signal is received as the synchronization signal. Next, at process block 626 the received RF signal is demodulated to form a synchronization signal. At process block 627, the synchronization signal is provided to one or more capture devices of the respective multimedia platform. Finally, at process block 628 a target sampling frequency is formed by each capture device as the common clock reference signal, according to the received synchronization signal. In one embodiment, the target sampling frequency is used to detect errors within the generated multimedia data stream, and correct the data by, for example, resampling or other signal processing techniques.

Figure 9:
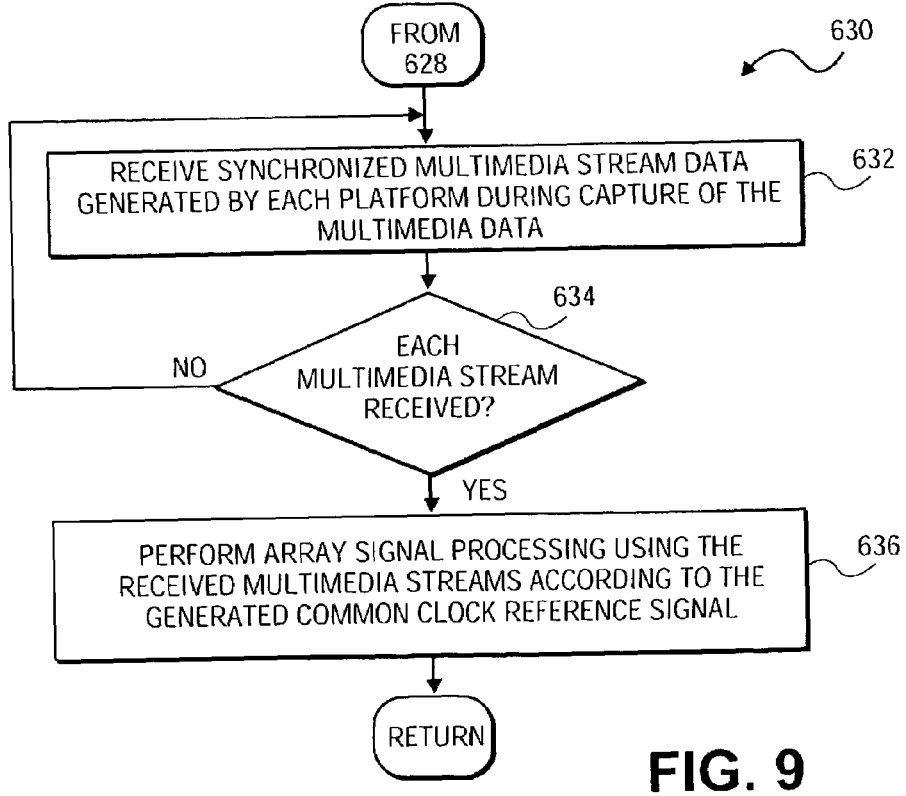
FIG. 9 depicts a flow chart illustrating an additional method for performing array signal processing using generated multimedia stream data, in accordance with the further embodiment of the present invention.

FIG. 9 depicts a flow chart illustrating an embodiment of a method 630 for collaborative signal processing within, for example, a distributed multimedia data capture system, for example, as depicted with reference to FIG. 5. At process block 632 a platform receives synchronized multimedia stream data generated by each platform during capture of the multimedia. This information is received by, for example, a platform configured to perform array signal processing using received multimedia stream data. Once it is determined that each multimedia stream is received, at process block 636 array signal processing is performed using the received multimedia stream data according to the generated common clock reference signal. In one embodiment, the array signal processing may include, but is not limited to, blind signal separation, beamforming multi-modal recognition, or the like.

Figure 10:
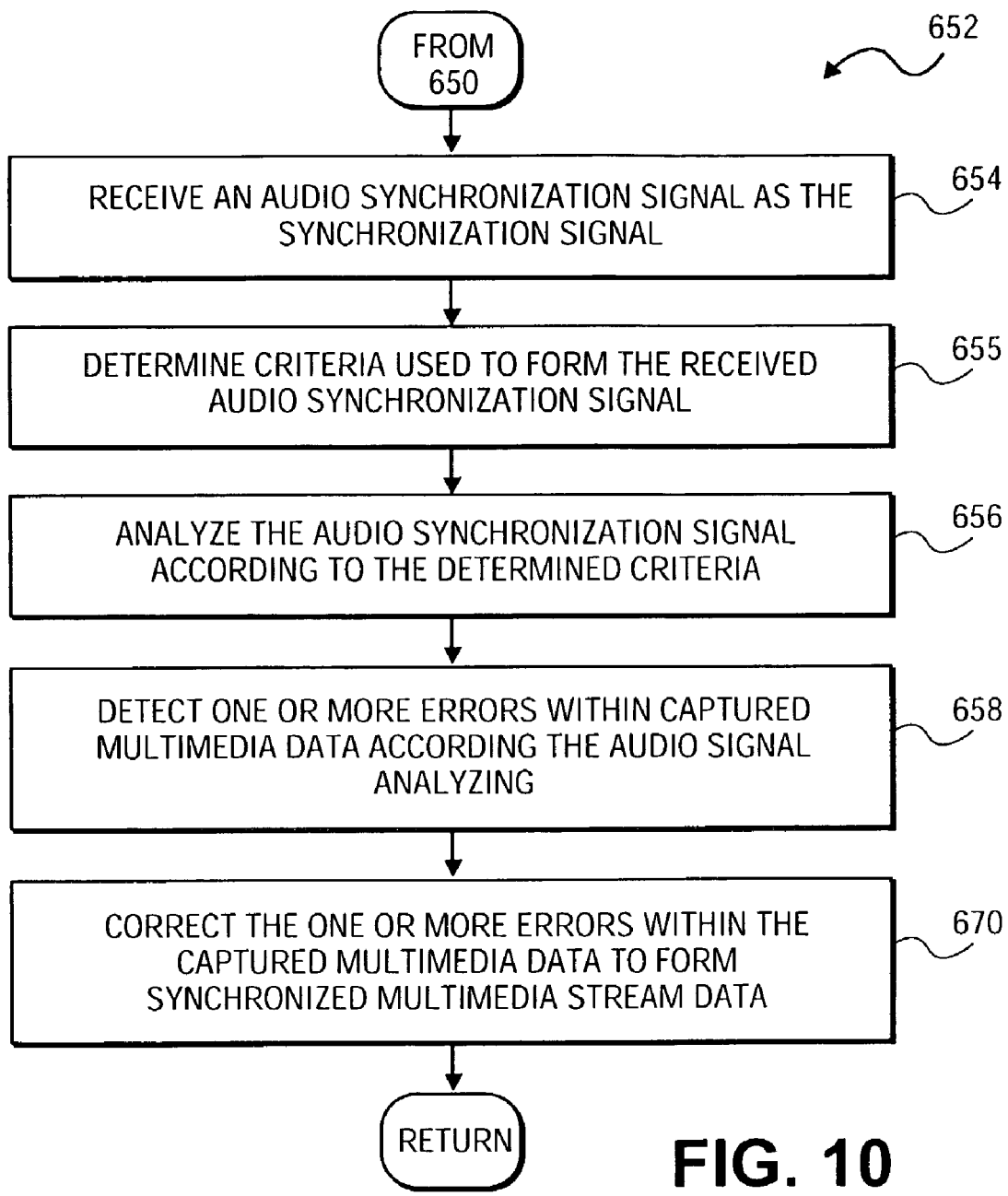
FIG. 10 depicts a flow chart illustrating an additional method for synchronizing captured multimedia data, in accordance with the further embodiment of the present invention.

FIG. 10 depicts a flow chart illustrating an additional method 652 for synchronizing captured multimedia data, in accordance with the further embodiment of the present invention. At process block 654 an audio synchronization signal is received as the synchronization signal. At process block 655, criteria used to form the received audio synchronization signal is determined. In one embodiment, the synchronization signal formation criteria may be predetermined by each platform during system initialization. Alternatively, the signal formation criteria may be modulated (piggybacked) onto the signal received from the synchronization generator.

Once the criteria is determined, the received audio synchronization signal is analyzed according to the determined criteria. In one embodiment, an expected audio synchronization signal is formed by the respective capture device and compared against the received audio synchronization signal. Once analyzed at process block 658 one or more errors are detected within captured multimedia data according to the signal analysis of process block 656. Finally, at process block 670 the one or more errors within the captured multimedia data are corrected to form synchronized multimedia stream data.

In the embodiments illustrated, this process may be repeated or is performed in parallel or concurrently for each capture device of the plurality of multimedia platforms. For example, utilizing an audio synchronization signal certain I/O devices may be utilized to capture the audio synchronization signal via an input channel while the remaining channels capture audio/video data, as well as audio data from a captured scene. As such, the captured video frames, as well as image samples may be corrected according to the audio synchronization signal.

Figure 11:
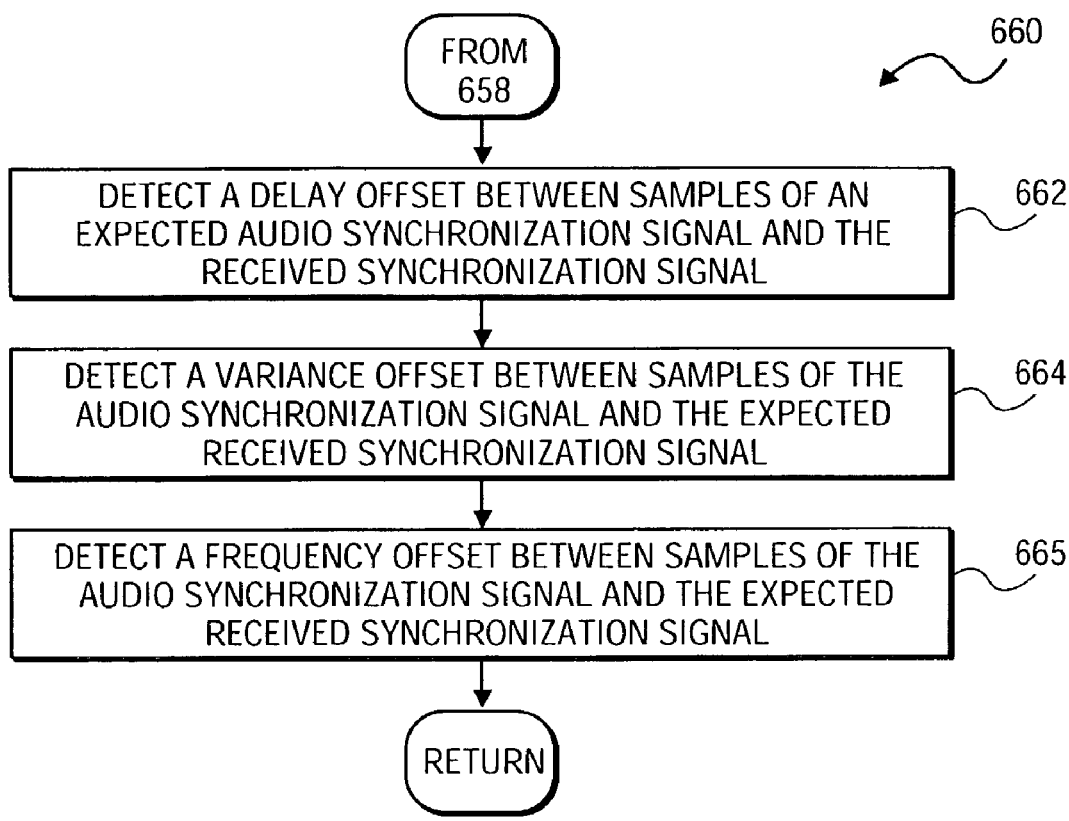
FIG. 11 depicts a flow chart illustrating an additional method for detecting one or more errors within captured multimedia data, in accordance with the further embodiment of the present invention.

FIG. 11 depicts a flow chart illustrating an additional method 660 for detecting one or more errors of process block 658, as depicted in FIG. 10, and in accordance with the further embodiment of the present invention. At process block 662 a delay offset is detected between samples of the received audio synchronization signal and an expected audio synchronization signal. In one embodiment, this may be performed in accordance with Equation (1), as described above, to determine a relative delay which can be positive or negative. Next, at process block 664 variance offset is detected between samples of the received audio synchronization signal and the expected audio synchronization signal. In one embodiment, this is performed to detect jitter which measures the stability of the given audio sequence.

Finally, at process block 665 a frequency offset is detected between samples of the received audio synchronization signal and the expected audio synchronization signal. In one embodiment, this is performed utilizing Equation (2) as described above in order to determine a drift between the expected audio synchronization signal and the received audio synchronization signal. As such, utilizing each of the determined, error offsets, captured multimedia data may be resampled in order to remove any relative delay, jitter, drift or other errors caused during multimedia stream data generation.

Figure 12:
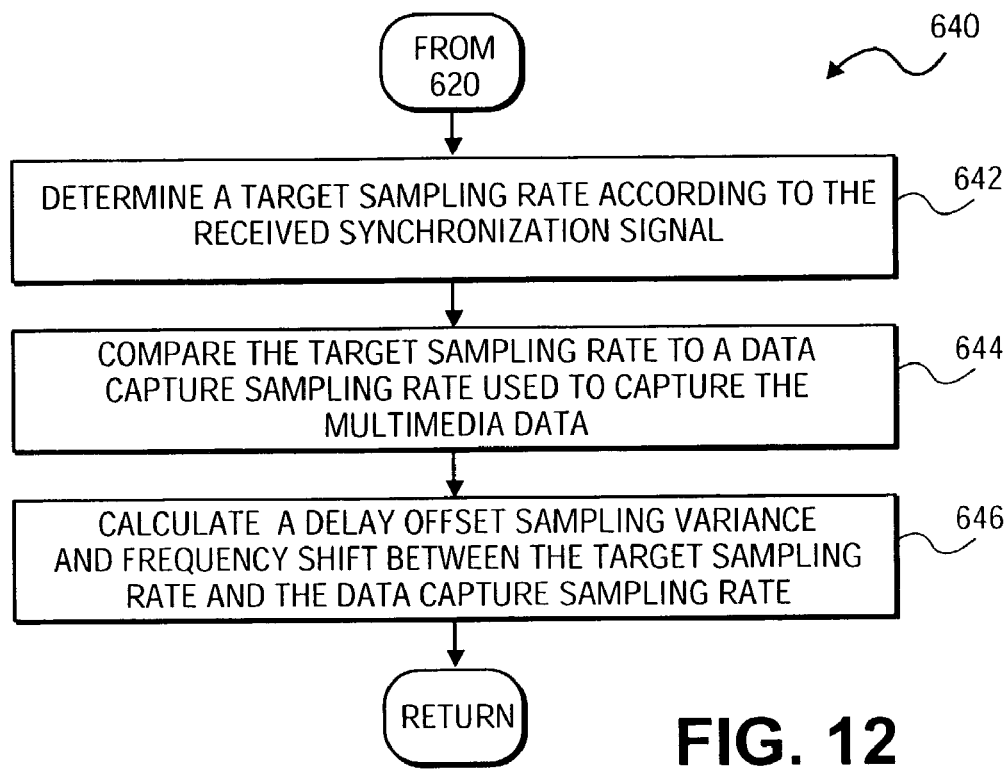
FIG. 12 depicts a flow chart illustrating an additional method for processing a received multimedia synchronization signal in accordance with the further embodiment of the present invention.

FIG. 12 depicts a flow chart illustrating an additional method 640 for processing the received synchronization signal. At process block 642 a target sampling rate is determined according to the received synchronization signal. Once determined, at process block 644 the target sampling rate is compared to a data capture sampling rate used to capture multimedia data. Finally, at process block 646 a delay offset, sampling variance, and frequency offset is calculated between the target sampling rate and the data captured sampling rate. In one embodiment, the delay offset, sampling variance, and frequency offset may be used to detect errors within captured multimedia data in order to generate synchronized multimedia stream data.

Figure 13:
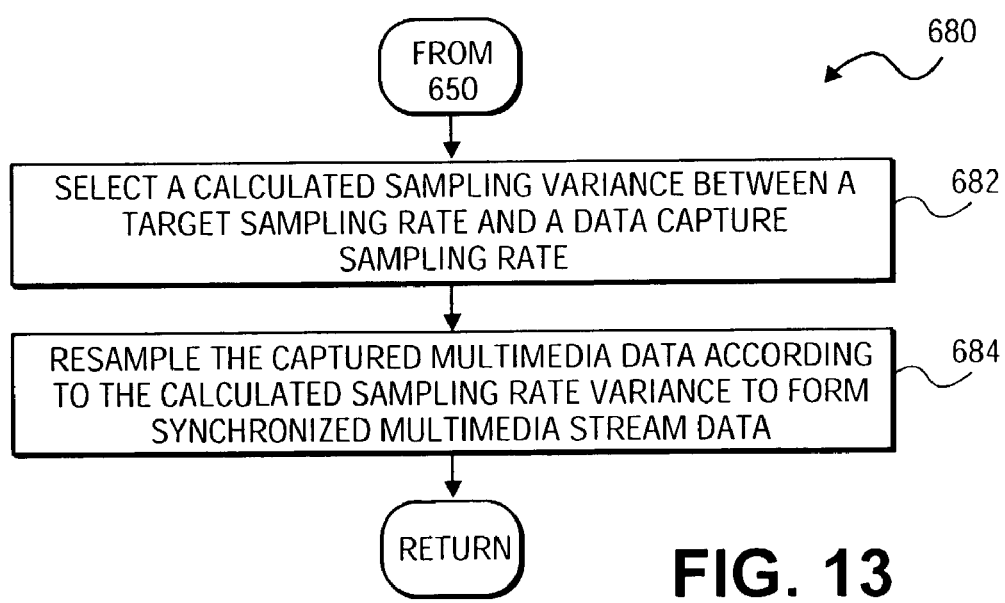
FIG. 13 depicts a flow chart illustrating an additional method for resampling generated multimedia stream data in order to synchronize a plurality of generated multimedia stream data, in accordance with the further embodiment of the present invention.

FIG. 13 depicts a flow chart illustrating an embodiment of an additional method 680 for synchronizing generated multimedia stream data. At process block 682 a calculated delay offset, sampling variance, and frequency offset between a target sampling rate and a data capture sampling rate is selected. Once selected at process block 684 the captured multimedia data is resampled according to the calculated delay offset, sampling rate variance, and frequency offset to form synchronized multimedia stream data. As such, by determining sampling variances between the target sampling rate and the data captured sampling rate any errors or discrepancies within generated multimedia stream data may be eliminated. Accordingly, each portion of multimedia stream data generated by a multimedia platform is synchronized according to a common clock reference signal.

Figure 14:
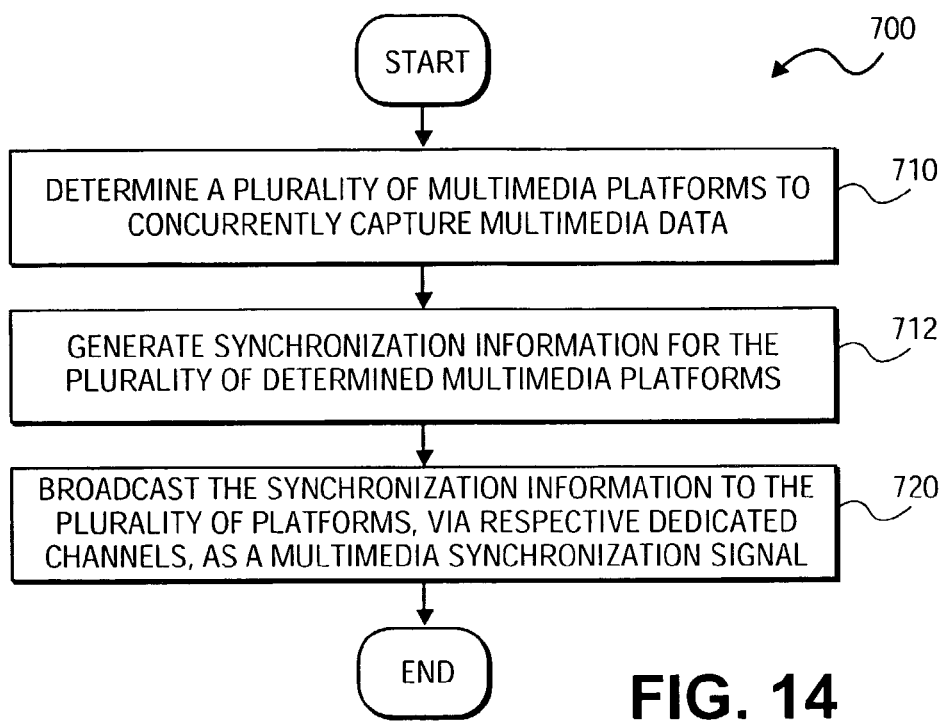
FIG. 14 depicts a flow chart illustrating a method for forming a distributed multimedia data capture system, in accordance with the further embodiment of the present invention.

FIG. 14 depicts a flow chart illustrating a method 700 for formation of a synchronized, distributed multimedia data capture system, for example, as depicted in FIG. 5, in accordance with one embodiment of the present invention. At process block 710 a plurality of multimedia platforms are determined to concurrently capture multimedia data. Once determined, at process block 712 synchronization information is generated for the plurality of multimedia platforms. Finally, at process block 720 the synchronization information is broadcast to the plurality of platforms via respective dedicated channels as a multimedia synchronization signal.

In one embodiment, the synchronization information is broadcast via one of a wireless link, such as an RF channel, or a wired link connection between a platform and a synchronization generator, for example, as depicted with reference to FIG. 5. Accordingly, one embodiment of the invention enables a new usage paradigm for PCs as devices for collaborative signal processing of multimedia signals. Conveniently, collaborative usage model for multiple PCs perform distributed computing on purely computational tasks.

Accordingly, utilizing a distributed signal processing model according to one embodiment of the invention, a conventional network of PCs is transformed into an array of synchronized sensors and actuators capable of performing complicated signal processing tasks such as beamforming, BSS, multi-modal recognition, and the like. Generally such complicated signal processing tasks are performed by dedicated digital signal processing (DSP) and application specific integrated circuit (ASIC)-based systems.

Figure 15:
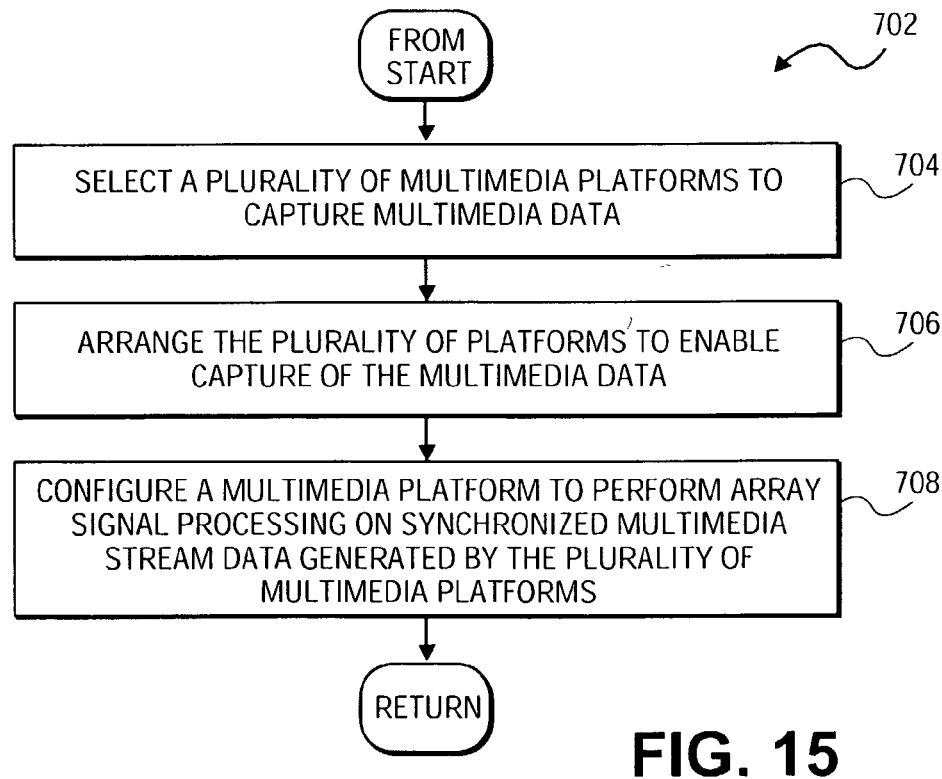
FIG. 15 depicts a flow chart illustrating an additional method for generating synchronization information from multimedia platforms within a distributed multimedia data capture system, in accordance with the further embodiment of the present invention.

FIG. 15 depicts a flow chart illustrating an additional method 702 performed prior to determining the multimedia platforms of process block 710, as depicted in FIG. 14, and in accordance with the further embodiment of the present invention. At process block 704, a plurality of multimedia platforms are selected to capture multimedia data. Once selected at process block 706, the plurality of multimedia platforms are arranged to enable capture of the multimedia data. In one embodiment, the arrangement may be performed according to beamforming algorithms, blind signal separation, multi-modal recognition, or the like. Finally, at process block 708 a multimedia platform is configured to perform array signal processing on synchronized multimedia stream data generated by each of the plurality of multimedia platforms.

Figure 16:
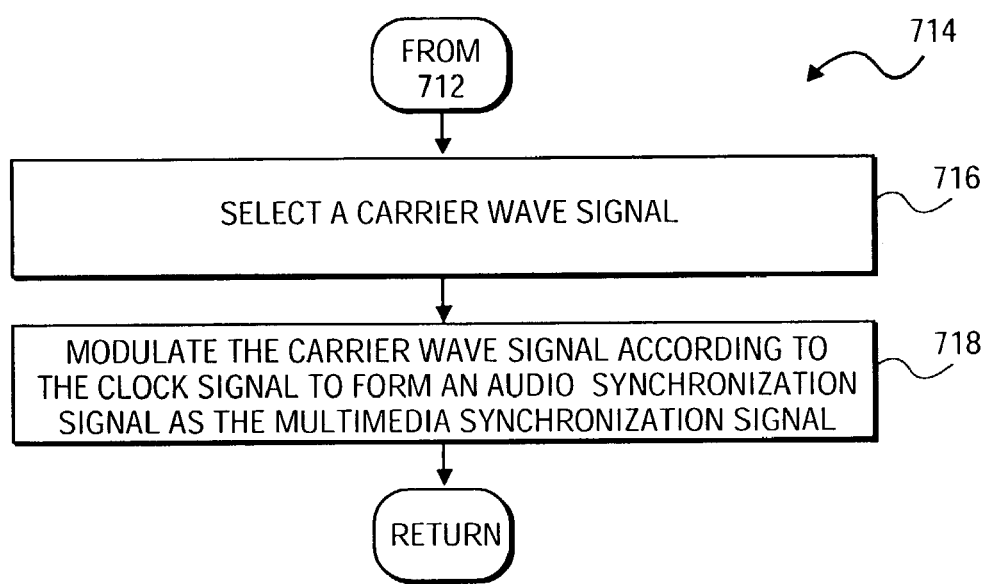
FIG. 16 depicts a flow chart illustrating an additional method for forming a synchronization signal in order to enable synchronization of multimedia stream data generated within a distributed multimedia data capture system, in accordance with the further embodiment of the present invention.

FIG. 16 depicts a flow chart illustrating an additional method 714 for generating the synchronization signal of process block 712, as depicted in FIG. 14, and in accordance with the further embodiment of the present invention. Accordingly, at process block 716 a carrier wave signal is selected. In one embodiment, the carrier wave signal can be chosen from many possible types. However, in the embodiment depicted, maximum length sequences (MLS) are selected due to their preferred correlation characteristics, such that the white noise generated by the carrier signal may be used to determine a target sampling rate at the various multimedia platforms.

Finally, at process block 718 the carrier wave signal is modulated according to the clock signal of, for example, a synchronization generator to form an audio synchronization signal as the multimedia synchronization signal. As such, each of the plurality of multimedia platforms will eventually resynchronize generated multimedia stream data using, for example, resampling according to the common clock signal of the synchronization generator.

ALTERNATIVE EMBODIMENTS

Several aspects of one implementation of the multimedia data synchronization for providing distributed array signal processing have been described. However, various implementations of the multimedia data synchronization provide numerous features including, complementing, supplementing, and/or replacing the features described above. Features can be implemented as part of a stand alone PC or as part of a distributed multimedia capture system in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a distributed multimedia capture system, it will be appreciated by those skilled in the art that the embodiments of the present invention can be applied to other systems. In fact, systems for multimedia synchronization fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments, of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   capturing, via a plurality of multimedia platforms, multimedia data;
   receiving, during capture of the multimedia data, a synchronization signal by each of the plurality of multimedia platforms;
   processing, by each multimedia platform, a received synchronization signal to generate a common clock reference signal among the plurality of multimedia platforms; and
   synchronizing captured multimedia data according to the common clock reference signal.

2. The method of claim 1, wherein receiving further comprises:
   receiving the synchronization signal from one of a wire link and a radio frequency (RF) link.

3. The method of claim 1, wherein receiving further comprises:
   providing a synchronization signal via a respective channel of one or more capture devices of the respective multimedia platform while each capture device captures multimedia data via one or more additional channels of the respective capture device;
   generating, by each capture device, a multimedia stream for the captured multimedia data; and embedding, by each capture device, the received synchronization signal within the generated multimedia stream to form a plurality of generated multimedia stream data.

4. The method of claim 1, wherein processing further comprises:
receiving a radio frequency (RF) signal as the synchronization signal;
demodulating the received RF signal to form a synchronization signal;
providing the synchronization signal to one or more capture devices of the respective multimedia platform; and
forming, by each capture device, a target sampling frequency as the common clock reference signal according to the received synchronization signal.

5. The method of claim 1, further comprising:
receiving synchronized multimedia stream data generated by each platform during capture of the multimedia data; and
performing array signal processing using the received multimedia streams according to the generated common clock reference signal.

6. The method of claim 1, wherein synchronizing further comprises:
receiving an audio synchronization signal as the synchronization signal;
determining criteria used to form the received audio synchronization signal;
analyzing the received audio synchronization signal according to the determined criteria;
detecting one or more errors within captured multimedia data according to the audio synchronization signal analysis; and
correcting the one or more errors within the captured multimedia data to form corrected multimedia stream data.

7. The method of claim 6, wherein detecting further comprises:
detecting a delay offset between samples of an expected audio synchronization signal and the received audio synchronization signal;
detecting variance between samples of the expected audio synchronization signal and the received audio synchronization signal; and
detecting a frequency offset between samples of the expected audio synchronization signal and received audio synchronization signal.

8. The method of claim 6, wherein correcting the multimedia data further comprises:
resampling the corrected multimedia stream data according to a delay offset, a sample variance offset and a frequency offset detected between an expected audio synchronization signal and the received audio synchronization signal to form synchronized multimedia stream data.

9. The method of claim 1, wherein processing further comprises:
determining a target sampling rate according to the received synchronization signal;
comparing the target sampling rate to a data capture sampling rate used to capture the multimedia data; and
calculating a delay offset, sampling variance, and frequency offset between the target sampling rate and the data capture sampling rate.

10. The method of claim 1, wherein synchronization further comprises:
selecting, by each respective multimedia platform, a calculated delay offset, sampling variance, and frequency offset between a target sampling rate and a data capture sampling rate; and
resampling, by each respective multimedia platform, the captured multimedia data according to the calculated delay offset, sampling rate variance, and frequency shift to form synchronized multimedia stream data.

11. A computer readable storage media containing executable computer program instructions which when executed cause a digital processing system to perform a method comprising:
capturing, via a plurality of multimedia platforms, multimedia data;
receiving, during capture of the multimedia data, a synchronization signal by each of the plurality of multimedia platforms;
processing, by each multimedia platform, a received synchronization signal to generate a common clock reference signal among the plurality of multimedia platforms; and
synchronizing captured multimedia data according to the common clock reference signal.

12. The computer readable storage media of claim 11, wherein receiving the synchronization signal causes the digital processing system to perform a method further comprising:
receiving the synchronization signal from one of a wire link and a radio frequency (RF) link.

13. The computer readable storage media of claim 11, wherein receiving the synchronization signal causes the digital processing system to perform a method further comprising:
providing a synchronization signal via a respective channel of one or more capture devices of the respective multimedia platform while each capture device captures multimedia data via one or more additional channels of the respective capture device;
generating, by each capture device, a multimedia stream for the captured multimedia data; and
embedding, by each capture device, the received synchronization signal within the generated multimedia stream to form a plurality of generated multimedia stream data.

14. The computer readable storage media of claim 11, wherein processing the synchronization signal causes the digital processing system to perform a method further comprising:
receiving a radio frequency (RF) signal as the synchronization signal;
demodulating the received RF signal to form a synchronization signal;
providing the synchronization signal to one or more capture devices of the respective multimedia platform; and
forming, by each capture device, a target sampling frequency as the common clock reference signal according to the received synchronization signal.

15. The computer readable storage media of claim 11, wherein the digital processing system is caused to perform a method further comprising:
receiving synchronized multimedia stream data generated by each platform during capture of the multimedia data; and performing array signal processing using the received multimedia streams according to the generated common clock reference signal.

16. The computer readable storage media of claim 11, wherein synchronizing captured multimedia data causes the digital processing system to perform a method further comprising:
receiving an audio synchronization signal as the synchronization signal;
determining criteria used to form the received audio synchronization signal;
analyzing the received audio synchronization signal according to the determined criteria;
detecting one or more errors within captured multimedia data according to the audio synchronization signal analysis; and
correcting the one or more errors within the captured multimedia data to form corrected multimedia stream data.

17. The computer readable storage media of claim 16, wherein detecting errors causes the digital processing system to perform a method further comprising:
detecting a delay offset between samples of an expected audio synchronization signal and the received audio synchronization signal;
detecting variance between samples of the expected audio synchronization signal and the received audio synchronization signal; and
detecting a frequency offset between samples of the expected audio synchronization signal and received audio synchronization signal.

18. The computer readable storage media of claim 16, wherein correcting the multimedia data causes the digital processing system to perform a method further comprising:
resampling the corrected multimedia data according to a delay offset, a sample variance offset and a frequency offset detected between an expected audio synchronization signal and the received audio synchronization signal to form synchronized multimedia stream data.

19. The computer readable storage media of claim 11, wherein processing the synchronization signal causes the digital processing system to perform a method further comprising:
determining a target sampling rate according to the received synchronization signal;
comparing the target sampling rate to a data capture sampling rate used to capture the multimedia data; and
calculating a delay offset, sampling variance, and frequency offset between the target sampling rate and the data capture sampling rate.

20. The computer readable storage media of claim 11, wherein synchronizing captured multimedia data causes the digital processing system to perform a method further comprising:
selecting, by each respective multimedia platform, a calculated delay offset, sampling variance, and frequency shift between a target sampling rate and a data capture sampling rate; and
resampling, by each respective multimedia platform, the captured multimedia data according to the calculated delay offset, sampling rate variance, and frequency offset to form synchronized multimedia stream data.

21. A method comprising:
determining a plurality of multimedia platforms to concurrently capture multimedia data;
generating synchronization information for the plurality of determined multimedia platforms; and
broadcasting the synchronization information to the plurality of platforms, via respective dedicated channels, as a multimedia synchronization signal.

22. The method of claim 21 wherein prior to determining, the method further comprises:
selecting a plurality of multimedia platforms to capture multimedia data;
arranging the plurality of platforms to enable capture of the multimedia data; and
configuring a multimedia platform to perform array signal processing on synchronized multimedia stream data generated by the plurality of multimedia platforms.

23. The method of claim 21, wherein generating the synchronization signal further comprises:
producing the multimedia synchronization signal for the multimedia platforms using a clock signal of a synchronization generator.

24. The method of claim 23, wherein producing further comprises:
selecting a carrier wave signal;
modulating the carrier wave signal according to the clock signal to form an audio synchronization signal as the multimedia synchronization signal.

25. The method of claim 21, wherein broadcasting further comprises:
transmitting the multimedia synchronization signal to each multimedia platform via a respective one of a wired link and a wireless radio frequency (RF) channel.

26. A system comprising:
a synchronization generator to generate a synchronization signal according to a clock signal of the synchronization generator; and
a plurality of multimedia platforms arranged to capture multimedia data via one or more capture devices and synchronize multimedia stream data generated from the captured multimedia data according to the synchronization signal generated by the synchronization generator.

27. The system of claim 26, further comprising:
a multimedia processing device to receive synchronized multimedia stream data from the plurality of multimedia platforms and perform array signal processing using the received, synchronized multimedia stream data.

28. The system of claim 26, wherein each multimedia platform further comprises:
one of a wired link and a radio frequency (RF) receiver to receive the multimedia synchronization signal.

29. The system of claim 26, wherein the synchronization generator further comprises:
a respective one of a wired link and a radio frequency (RF) transmitter to transmit the multimedia synchronization signal each of the plurality of multimedia platforms.

30. An apparatus, comprising:
a processor having circuitry to execute instructions;
one or more capture devices coupled to the processor, each capture device captures multimedia data while receiving a synchronization signal and embeds the synchronization signal within multimedia stream generated from captured multimedia data; and
a storage device coupled to the processor, having sequences of instructions stored therein, which when executed by the processor cause the processor to:
synchronize the generated multimedia stream data according to the received synchronization signal.

31. The apparatus of claim 30, wherein an instruction to synchronize the multimedia stream data further causes the processor to:
- receive an audio synchronization signal as the synchronization signal;
- determine criteria used to form the received audio synchronization signal;
- analyze the received audio synchronization signal according to the determined criteria;
- detect one or more errors within captured multimedia data according to the audio synchronization signal analysis; and
- correct the one or more errors within the captured multimedia data to form corrected multimedia stream data.

32. The apparatus of claim 30, wherein an instruction to detect one or more errors further causes the processor to:
- detect a delay offset between samples of an expected audio synchronization signal and the received audio synchronization signal;
- detect variance between samples of the expected audio synchronization signal and the received audio synchronization signal; and
- detect a frequency offset between samples of the expected audio synchronization signal and received audio synchronization signal.

33. The apparatus of claim 30, wherein an instruction to correct the multimedia data further causes the processor to:
- resample the corrected multimedia stream data according to a delay offset, a sample variance offset and a frequency offset detected between an expected audio synchronization signal and the received audio synchronization signal to form synchronized multimedia stream data.

34. A method comprising:
- capturing, via a plurality of multimedia platforms, multimedia data;
- receiving, during capture of the multimedia data, a synchronization signal by each of the plurality of multimedia platforms; and
- embedding, by each capture device of each multimedia platform, the received synchronization signal within generated multimedia streams to form a plurality of generated multimedia stream data.

35. The method of claim 34, further comprising:
- processing, by each multimedia platform, a received synchronization signal to generate a common clock reference signal among the plurality of multimedia platforms; and
- synchronizing, by each multimedia platform, captured multimedia data according to the common clock reference signal.

36. The method of claim 34, wherein embedding further comprises:
- providing, by each multimedia platform, the generated multimedia stream to a synchronization platform; and
- synchronizing, by the synchronization platform, each received multimedia stream according to a common clock reference signal determined according to a synchronization signal embedded within the received multimedia streams.

37. The method of claim 34, wherein embedding further comprises:
- converting the received synchronization signal into a watermark; and
- encoding the watermark onto a multimedia stream generated from a channel of a capture device used to capture multimedia scene data.

38. The method of claim 34, wherein embedding further comprises:
- converting the received synchronization signal into a watermark; and
- adding the watermark to audio/video data captured by a channel of a capture device used to capture multimedia scene data.

39. A computer readable storage media containing executable computer program instructions which when executed cause a digital processing system to perform a method comprising:
- capturing, via a plurality of multimedia platforms, multimedia data;
- receiving, during capture of the multimedia data, a synchronization signal by each of the plurality of multimedia platforms; and
- embedding, by each capture device of each multimedia platform, the received synchronization signal within generated multimedia stream to form a plurality of generated multimedia stream data.

40. The computer readable storage medium of claim 39 which when executed cause a digital processing system to perform a method further comprising:
- processing, by each multimedia platform, a received synchronization signal to generate a common clock reference signal among the plurality of multimedia platforms; and
- synchronizing, by each multimedia platform, captured multimedia data according to the common clock reference signal.

41. The computer readable storage medium of claim 39, wherein embedding the synchronization signal causes the digital processing system to perform a method further comprising:
- providing, by each multimedia platform, the generated multimedia stream to a synchronization platform; and
- synchronizing, by the synchronization platform, each received multimedia stream according to a common clock reference signal determined according to the synchronization signal embedded within the received multimedia streams.

42. The computer readable storage medial of claim 39 wherein embedding the synchronization signal causes the digital processing system to perform a method further comprising:
- converting the received synchronization signal into a watermark; and
- encoding the watermark onto a multimedia stream generated from a channel of a capture device used to capture multimedia scene data.

43. The computer readable storage medial of claim 39, wherein embedding the synchronization signal causes the digital processing system to perform a method further comprising:
- converting the received synchronization signal into a watermark; and
- adding the watermark to a multimedia data captured by a channel of a capture device used to capture multimedia scene data.

* * * * *